US006317708B1

(12) United States Patent
Witbrock et al.

(10) Patent No.: US 6,317,708 B1
(45) Date of Patent: Nov. 13, 2001

(54) METHOD FOR PRODUCING SUMMARIES OF TEXT DOCUMENT

(75) Inventors: Michael J. Witbrock, Newton, MA (US); Vibhu O. Mittal, Pittsburgh, PA (US)

(73) Assignee: JustSystem Corporation (JP)

( * ) Notice: Subject to any disclaimer, the term of this patent is extended or adjusted under 35 U.S.C. 154(b) by 0 days.

(21) Appl. No.: 09/351,952

(22) Filed: Jul. 12, 1999

Related U.S. Application Data

(60) Provisional application No. 60/115,016, filed on Jan. 7, 1999.

(51) Int. Cl.⁷ .............................. G06F 17/27; G06F 17/30
(52) U.S. Cl. .............................................. 704/9; 707/531
(58) Field of Search ................... 704/12, 9, 10; 707/500, 531, 532

(56) References Cited

U.S. PATENT DOCUMENTS

| | | | |
|---|---|---|---|
| 5,077,668 | 12/1991 | Doi ........................................ | 364/419 |
| 5,297,027 | 3/1994 | Morimoto et al. .............. | 364/419.19 |
| 5,384,703 | 1/1995 | Withgott et al. ................ | 364/419.19 |
| 5,491,760 | 2/1996 | Withgott et al. ..................... | 382/203 |
| 5,510,981 | 4/1996 | Berger et al. .................... | 364/419.02 |
| 5,638,543 | 6/1997 | Pedersen et al. ..................... | 395/751 |
| 5,689,716 | 11/1997 | Chen .................................... | 395/761 |
| 5,701,500 | * 12/1997 | Ikeo et al. ............................. | 707/531 |
| 5,708,825 | * 1/1998 | Sotomayor ............................... | 704/9 |
| 5,774,845 | * 6/1998 | Ando et al. ........................... | 704/231 |
| 5,778,397 | 7/1998 | Kupiec et al. ....................... | 707/500 |
| 5,848,191 | * 12/1998 | Chen et al. ........................... | 382/229 |
| 5,924,108 | * 7/1999 | Fein et al. ............................ | 707/531 |
| 6,064,952 | * 5/2000 | Imanaka et al. .......................... | 704/9 |
| 6,157,912 | * 12/2000 | Kneser ................................. | 704/270 |
| 6,178,401 | * 1/2001 | Franz .................................. | 704/255 |
| 6,205,456 | * 3/2001 | Nakao ................................. | 707/531 |

OTHER PUBLICATIONS

H.P. Luhn, "The Automatic Creation of Literature Abstracts", IBM Journal (1958) pp. 159–165.

H.P. Edmundson, "New Methods in Automatic Extracting", Journal of the Association for Computing Machinery, vol. 16, No. 2 (1969), pp. 264–285.

Betty A. Mathis et al., "Improvement of Automatic Abstracts by the Use of Structural Analysis", Journal of the American Society for Information Science (1973), pp. 101–109.

Lisa F. Rau, et al. "Information Extraction And Text Summarization Using Linguistic Knowledge Acquisition", Information Processing & Management, (1989), vol. 25, No. 4, pp. 419–428.

Ulrich Reimer, et al. "Text Condensation as Knowledge Base Abstraction", University of Constance Information Science Group (1988), Germany, pp. 338–344.

Gerald Salton, et al. "Automatic Text Decomposition Using Text Segments and Text Themes", Department of Computer Science, Cornell University (undated).

Gerald DeJong, "An Overview of the FRUMP System", Yale University, pp. 149–176 (undated).

(List continued on next page.)

Primary Examiner—Patrick N. Edouard
(74) Attorney, Agent, or Firm—Webb Ziesenheim Logsdon Orkin & Hanson, P.C.

(57) ABSTRACT

A computer method for preparing a summary string from a source document of encoded text. The method comprises comparing a training set of encoded text documents with manually generated summary strings associated therewith to learn probabilities that a given summary word or phrase will appear in summary strings given a source word or phrase appears in encoded text documents and constructing from the source document a summary string containing summary words or phrases having the highest probabilities of appearing in a summary string based on the learned probabilities established in the previous step.

14 Claims, 1 Drawing Sheet

OTHER PUBLICATIONS

Eduard Hovy et al.. "Automated Text Summarization in SUMMARIST", Information Sciences Institute of the University of Souther California (8 pp.) (undated).

Kathleen McKeown et al., "Generating Summaries of Multiple News Articles", Department of Computer Science, Columbia University, pp. 1–9 (undated).

Daniel Marcu, "From discourse structures to text summaries", Department of Computer Science, University of Toronto, Canada (7 pp.) (undated).

Danilo Fum et al., "Evaluating Importance: A Step Towards Text Summarization", Udine, Italy (4 pp.) (undated).

* cited by examiner

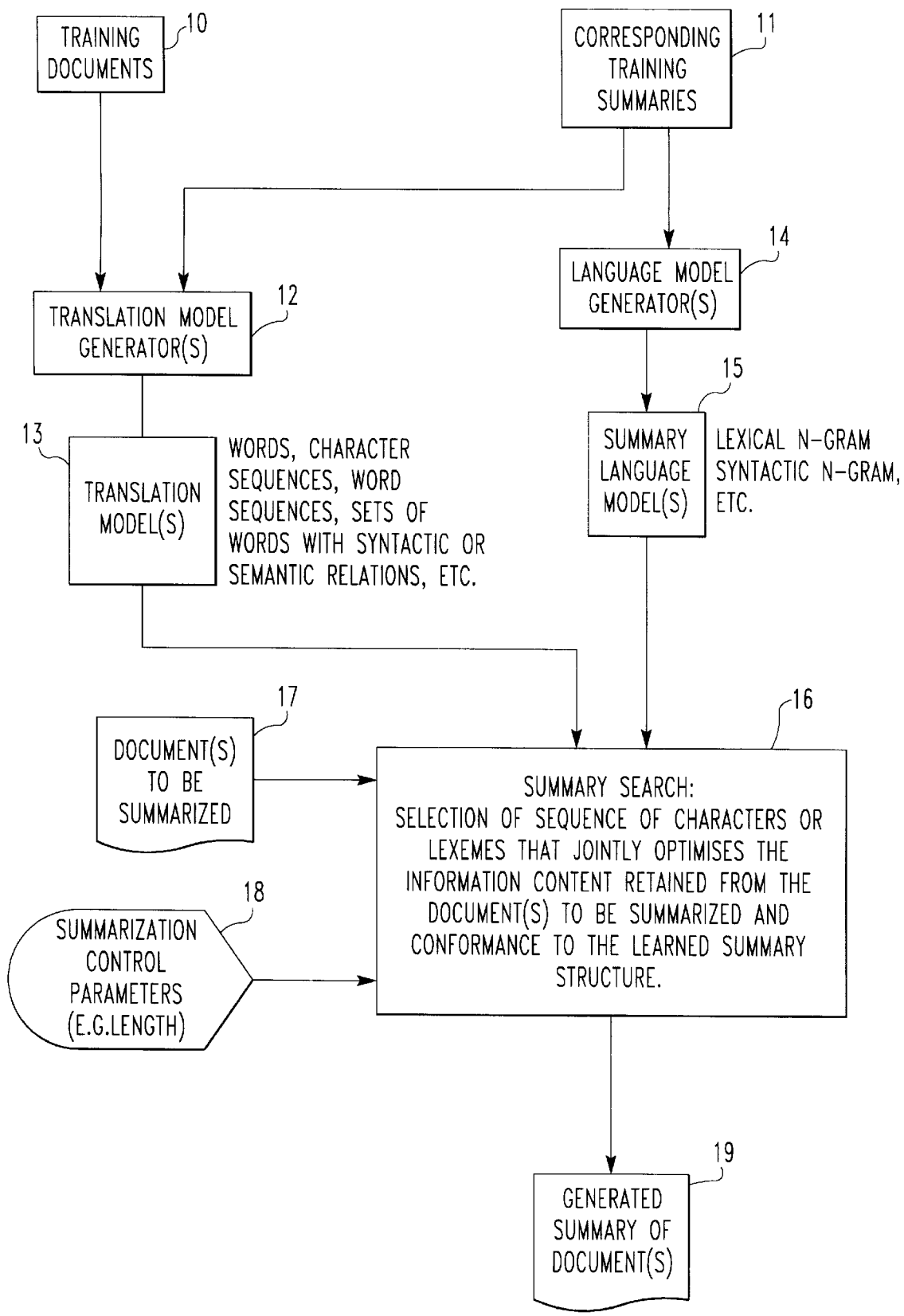

METHOD FOR PRODUCING SUMMARIES OF TEXT DOCUMENT

CROSS REFERENCE TO RELATED APPLICATION

This application claims the benefit of U.S. Provisional Patent Application No. 60/115,016, filed Jan. 7, 1999.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Extractive summarization is the process of selecting and extracting text spans—usually whole sentences—from a source document. The extracts are then arranged in some order (usually the order as found in the source document) to form a summary. In this method, the quality of the summary is dependent on the scheme used to select the text spans from the source document. Most of the prior art uses a combination of lexical, frequency and syntactic cues to select whole sentences for inclusion in the summary. Consequently, the summaries cannot be shorter than the shortest text span selected and cannot combine concepts from different text spans in a simple phrase or statement. U.S. Pat. No. 5,638,543 discloses selecting sentences for an extractive summary based on scoring sentences based on lexical items appearing in the sentences. U.S. Pat. No. 5,077,668 discloses an alternative sentence scoring scheme based upon markers of relevance such as hint words like "important", "significant" and "crucial". U.S. Pat. No. 5,491,760 works on bitmap images of a page to identify key sentences based on the visual appearance of hint words. U.S. Pat. Nos. 5,384,703 and 5,778,397 disclose selecting sentences scored on the inclusion of the most frequently used non-stop words in the entire text.

In contrast to the large amount of work that has been undertaken in extractive summarization, there has been much less work on generative methods of summarization. A generative method of summarization selects words or phrases (not whole sentences) and generates a summary based upon the selected words or phrases. Early approaches to generative methods are discussed in the context of the FRUMP system. See DeJong, G. F., "An Overview of the FRUMP System", *Strategies for Natural Language Processing*, (Lawrence Erlbaum Associates, Hillsdale, N.J. 1982). This system provides a set of templates for extracting information from news stories and presenting it in the form of a summary. Neither the selection of content nor the generation of the summary is learned by the system. The selection templates are handcrafted for a particular application domain. Other generative systems are known. However, none of these systems can: (a) learn rules, procedures, or templates for content selection and/or generation from a training set or (b) generate summaries that may be as short as a single noun phrase.

The method disclosed herein relates somewhat to the prior art for statistically modeling of natural language applied to language translation. U.S. Pat. No. 5,510,981 describes a system that uses a translation model describing correspondences between sets of words in a source language and sets of words in a target language to achieve natural language translation. This system proceeds linearly through a document producing a rendering in the target language of successive document text spans. It is not directed to operate on the entire document to produce a summary for the document.

SUMMARY OF THE INVENTION

As used herein, a "summary string" is a derivative representation of the source document which may, for example, comprise an abstract, key word summary, folder name, headline, file name or the like. Briefly, according to this invention, there is provided a computer method for generating a summary string from a source document of encoded text comprising the steps of:

a) comparing a training set of encoded text documents with manually generated summary strings associated therewith to learn probabilities that a given summary word or phrase will appear in summary strings given that a source word or phrase appears in an encoded text document; and b) from the source document, generating a summary string containing a summary word, words, a phrase or phrases having the highest probabilities of appearing in a summary string based on the learned probabilities established in the previous step. Preferably, the summary string contains the most probable summary word, words, phrase or phrases for a preselected number of words in the summary string.

In one embodiment, the training set of encoded manually generated summary strings is compared to learn the probability that a summary word or phrase appearing in a summary string will follow another summary word or phrase. Summary strings are generated containing the most probable sequence of words and/or phrases for a preselected number of words in the summary string.

In a preferred embodiment, the computer method, according to this invention, comprises comparing a training set of encoded text documents with manually generated summary strings associated therewith to learn the probabilities that a given summary word or phrase will appear in summary strings given a source word or phrase appears in the encoded text considering the context in which the source word or phrase appears in the encoded text documents. For example, the context in which the source words or phrases may be considered includes titles, headings, standard paragraphs, fonts, bolding, and/or italicizing.

In yet another preferred embodiment, the computer method, according to this invention, further comprises learning multiple probabilities that a summary word or phrase will appear in a summary string given a source word or phrase appears in the encoded text and considering the various usages of the word or phrase in the encoded text, for example, syntactic usages and semantic usages.

In a still further preferred embodiment, according to this invention, the step for comparing a training set of encoded manually generated summary strings takes into consideration external information in the form of queries, user models, past user interaction and other biases to optimize the form of the generated summary strings.

BRIEF DESCRIPTION OF THE DRAWING

Further features and other objects and advantages will become clear from the following detailed description made with reference to the drawing which is a schematic diagram illustrating the processing of text to produce summaries.

DESCRIPTION OF THE PREFERRED EMBODIMENTS

Referring now to the drawing, a collection of representative documents are assembled at 10 and corresponding manually generated summaries are assembled at 11. These comprise a training set. They are encoded for computer processing and stored in computer memory. They may be preprocessed to add syntactic and semantic tags.

The documents and summaries are processed in the translation model generator at 12 to build a translation model 13 which is a file containing the probabilities that a word found in a summary will be found in the document. The translation model generator constructs a statistical model describing the relationship between the text units or the annotated text units in documents and the text units or annotated text units used in the summaries of documents. The translation model is used to identify items in a source document 17 that can be used in summaries. These items may include words, parts of speech ascribed to words, semantic tags applied to words, phrases with syntactic tags, phrases with semantic tags, syntactic or semantic relationships established between words or phrases in the document, structural information obtained from the document, such as positions of words or phrases, mark-up information obtained from the document such as the existence of bold face or italics, or of headings or section numbers and so forth.

The summaries are processed by the language model generator 14 to produce a summary language model 15. The language model is a file containing the probabilities of each word or phrase found in the training set summaries following another word or phrase. The language model generator builds a statistical model describing the likely order of appearance of text units or annotated text units in summaries. The headlines or summaries may be preprocessed to identify text items that can be used in determining the typical structure of summaries. These text items may include words, parts of speech ascribed to words, semantic tags applied to words, phrases, phrases with syntactic tags, syntactic or semantic relations established between words or phrases, structure information, such as positions of words or phrases in the summary, and so forth.

The translation model 13 and summary language mode 15 along with a document 17 to be summarized and summarization control parameters 18 are supplied to the summary search engine 16 to select a sequence of items characters or lexemes) that jointly optimize the information content extracted from the source document to be summarized. These are supplied to the summary generation engine 19 which generates the summary.

The following Table is an example document for explaining the practice of this invention:

TABLE 1

"The U.N. Security Council on Monday was to address a dispute between U.N. chief weapons inspector Richard Butler and Iraq over which disarmament documents Baghdad must hand over. Speaking in an interview with CNN on Sunday evening, Butler said that despite the latest dispute with Iraq, it was too soon to make a judgment that the Iraqis had broken last week's agreement to unconditionally resume cooperation with weapons inspector -- an agreement which narrowly averted air strikes by the United States and Britain."

Some possible headline/summaries for the document produced above are:

"Security Council to address Iraqi document dispute."

"Iraqi Weapons Inspections Dispute."

These summaries illustrate some of the reasoning required for summarization. The system must decide (1) what information to present in the summary, (2) how much detail to include in the summary or how long the summary can be, and (3) how best to phrase the information so that it seems coherent. The two summaries above illustrate some of the issues of length, content and emphasis.

The statistical models are produced by comparison of a variety of documents and summaries for those documents similar to those set forth above to learn for a variety of parameter settings, mechanisms for both (1) content selection for the most likely summaries of a particular length and (2) generating coherent English (or any other language) text to express the content. The learning for both content selection and summary generation may take place at a variety of conceptual levels ranging from characters, words, word sequences or n-grams, phrases, text spans and their associated syntactic and semantic tags. In this case, prior to the comparison, the texts in the training sets must be tagged.

Set forth in the following table is the text of Table 1 after being tagged with syntactic parts of speech using the LDC standard, e.g., DT: definite article, NNP: proper noun, JJ: adjective.

TABLE 2

The_DT U.N._NNP Security_NNP Council_NNP on_IN
Monday_NNP was_VBD to_TO address_VB a_NN dispute_NN
between_IN U.N._NNP chief_JJ weapons_NNS
inspector_NN Richard_NNP Butler_NNP and_CC Iraq_NNP
over_IN which_WDT disarmament_NN documents_NNS
Baghdad_NNP must_NN hand_NN over._CD _NN _NN _NN
Speaking_VBG in_IN an_DT interview_NN with_IN
CNN_NNP on_IN Sunday_NNP evening,_NNP Butler_NNP
said_VBD that_IN despite_IN the_DT latest_JJS
dispute_NN with_IN Iraq,_NNP it_PRP was_VBD too_RB
soon_RB to_VBP make_VB a_DT judgment_NN that_IN
the_DT Iraqis_NNPS had_VBD broken_VBN last_JJ
week's_NN agreement_NN to_TO unconditionally_RB
resume_VB cooperation_NN with_NN weapons_NNS
inspectors:_NNS an_DT agreement_NN which_WDT
narrowly_RB averted_VBP airstrikes_NNS by_IN the_DT
United_NNP States_NNPS and_CC Britain._NNP.

Set forth in the following table is the text of Table 1 with named entity markers after being tagged with semantic tags using the TIPSTER/MUC standards, e.g., NE: named entity, TE: temporal entity, LOC: location.

TABLE 3

The [U.N. Security Council]- NE on [Monday]- TE was to
address a dispute between [U.N.]- NE chief weapons
inspector [Richard Butler]- NE and [Iraq]- NE over
which disarmament documents [Baghdad]- NE must hand
over.
Speaking in an interview with [CNN]- NE on [Sunday]-
TE evening, [Butler]- NE said that despite the latest
dispute with [Iraq]- NE, it was too soon to make a
judgment that the [Iraqis]- NE had broken last week's
agreement to unconditionally resume cooperation with
weapons inspectors - an agreement which narrowly
averted airstrikes by the [United States]- NE and
[Britain]- NE.

Set forth in the following table is the text of Table 1 after being tagged with semantic tags, e.g., AGENT, CIRCUMSTANCE, CIRCUMSTANCE/TEMPORAL, COMMUNICATIVE_ACTION, and OBJECT.

TABLE 3A

The [U.N. Security Council]-AGENT on [Monday]-CIRCUMSTANCE/TEMPORAL [was to address]-COMMUNICATIVE_ACTION [a dispute between U.N. chief weapons inspector Richard Butler and Iraq over which disarmament documents Baghdad must hand over.]-OBJECT
[Speaking in an interview with CNN on Sunday evening,]-CIRCUMSTANCE [Butler]-AGENT [said]-COMMUNICATIVE_ACTION [that despite the latest dispute with Iraq, it was too soon to make a judgement that the Iraqis had broken last week's agreement to unconditionally resume cooperation with weapons inspectors -- an agreement which narrowly averted airstrikes by the United States and Britain.]-OBJECT The training set is used to model the relationship between the appearance of some features (text spans, labels, or other syntactic and semantic features of the document) in the document, and the appearance of features in the summary. This can be, in the simplest case, a mapping between the appearance of a word in the document and the likelihood of the same or another word appearing in the summary.

The applicants used a training set of over twenty-five thousand documents that had associated headlines or summaries. These documents were analyzed to ascertain the conditional probability of a word in a document given that the word appears in the headline. In the following table, the probabilities for words appearing in the text of Table 1 are set forth.

TABLE 4

| Word | Conditional Probability |
| --- | --- |
| Iraqi | 0.4500 |
| Dispute | 0.9977 |
| Weapons | 1.000 |
| Inspection | 0.3223 |
| Butler | 0.6641 |

The system making use of the translation model extracts words or phrases from the source text based upon the probability these or other words will appear in summaries.

The probability that certain subsets of words individually likely to appear in summaries will appear in combination can be calculated using Bayes theorem. Thus, the probability that the phrase "weapons inspection dispute", or any ordering thereof may be expressed simply:

Pr("weapons"|"weapons" in document)*Pr("inspection"|"inspection" in document)*Pr("dispute"|"dispute" in document).

Equivalently, this probability may be expressed:

Log(Pr("weapons"|"weapons" in document))+
Log(Pr("inspection"|"inspection" in document))+
Log(Pr("dispute"|"dispute" in document)).

More involved models can express the relationship among arbitrary subsets, including subsequences, of the words in the document and subsets of candidate words that may appear in the summary. The more involved models can express relationships among linguistic characterizations of subsets of terms in the document and summaries such as parts-of-speech tags, or parse trees.

The more involved models may express relationships among these sets of terms and meta-information related to the document or the summary, such as length, derived statistics over terms (such as proportion of verbs or nouns in the document, average sentence length, etc.), typographical information, such as typeface, formatting information, such as centering, paragraph breaks and so forth, and meta-information, such as provenance (author, publisher, date of publication, Dewey or other classification) recipient, reader, news group, media through which presented (web, book, magazine, TV chiron or caption).

One of the advantages in learning a content selection model is that the system can learn relationships between summary terms that are not in the document and terms that are in the document, and apply those relationships to new documents thereby introducing new terms in the summary.

Once a content selection model has been trained on the training set, conditional probabilities for the features that have been seen in the summaries can be computed. The summary structure generator makes use of these conditional probabilities to compute the most likely summary candidates for particular parameters, such as length of summary. Since the probability of a word appearing in a summary can be considered to be independent of the structure of the summary, the overall probability of a particular candidate summary can be computed by multiplying the probabilities of the content in the summary with the probability of that content expressed using a particular summary structure (e.g., length and/or word order).

Since there is no limitation on the types of relationships that can be expressed in the content selection model, variations on this invention can use appropriate training sets to produce a cross-lingual or even cross-media summary. For example, a table expressing the conditional probability that an English word should appear in a summary of a Japanese document could be used to simultaneously translate and summarize Japanese documents.

An inventory of spoken word forms, together with a concatenative synthesis algorithm and a table of conditional probabilities that speech segments would be used in a spoken summary of a particular document, could be used to generate spoken summaries. Similarly, corresponding video or other media could be chosen to represent the content of documents.

EXAMPLE

For use in generating summaries, the probability of finding particular words in a summary is learned from the training set. For certain words appearing in the text set forth in Table 1, the learned probabilities are listed in the following table:

TABLE 5

| Word | Log probability of word in Reuters headlines |
| --- | --- |
| Iraqi | −3.0852 |
| Dispute | −1.0651 |
| Weapons | −2.7098 |
| Inspection | −2.8417 |
| Butler | −1.0038 |

Also, for generating summaries, the probability of finding pairs of words in sequence in the training set summaries is learned. For certain words appearing in the text set forth in Table 1, the learned probabilities are listed in the following table:

TABLE 6

| Word pair (word 1, word 2) | Log probability of word 2 given word 1 |
| --- | --- |
| Iraqi weapons | −0.7622 |
| Weapons inspection | −0.6543 |
| Inspection dispute | −1.4331 |

To calculate the desirability of a headline containing the sequence "Iraqi weapons inspection . . . ", the system multiplies the likelihood of seeing the word "Iraqi" in a headline (see Table 5) by it being followed by "weapons" and that being followed by "inspection" (see Table 6). This may be expressed as follows:

Log(P("Iraqi"))+Log(P("weapons"|"Iraqi"))+
Log(P("inspection"|"weapons")), which, using the values in the tables, yields a log probability of −2.8496. Alternative sequences using the same words, such as "Iraqi dispute weapons", have probabilities that can be calculated similarly. In this case, the sequence "Iraqi dispute weapons" has not appeared in the training data, and is estimated using a back-off weight. A back-off weight is a very small but non-zero weight or assigned probability for words not appearing in the training set.

These calculations can be extended to take into account the likelihood of semantic and syntactic tags both at the word or phrase level, or can be carried out with respect to textual spans from characters on up. The calculations can also be generalized to use estimates of the desirability of sequences of more than two text spans (for example, trigram (three-word sequence) probabilities may be used).

Other measures of the desirability of word sequences can be used. For example, the output of a neural network trained to evaluate the desirability of a sequence containing certain words and tags could be substituted for the log probabilities used in the preceding explanation. Moreover, other combination functions for these measures could be used rather than multiplication of probabilities or addition of log probabilities.

In general, the summary generator comprises any function for combining any form of estimate of the desirability of the whole summary under consideration such that this overall estimate can be used to make a comparison between a plurality of possible summaries.

Even though the search engine and summary generator have been presented as two separate processes, there is no reason for these to be separate.

In the case of the phrase discussed above, the overall weighting used in ranking can, as one possibility, be obtained as a weighted combination of the content and structure model log probabilities.

Alpha*(Log(Pr("Iraqi"|"Iraqi" in doc))+
Log(Pr("weapons"|"weapons" in doc))+
Log(Pr("inspection"|"inspection" in doc)))+
Beta*(Log(Pr("Iraqi"|start_of_sentence))+
Log(Pr((weapons"|"Iraqi"))+Log(Pr("inspection"|"weapons"))).

Using a combination of content selection models, language models of user needs and preferences, and summary parameters, a plurality of possible summaries, together with estimates of their desirability, is generated. These summaries are ranked in order of estimated desirability, and the most highly ranked summary or summaries are produced as the output of the system.

Depending on the nature of the language, translation and other models, heuristic means may be employed to permit the generation and ranking of only a subset of the possible summary candidates in order to render the summarization process computationally tractable. In the first implementation of the system, Viterbi beam search was used to greatly limit the number of candidates produced. The beam search makes assumptions regarding the best possible word in at the front position of a summary and in consideration of the next position will not undo the assumption concerning. the first position. Other search techniques, such as A* or IDA*, SMA*, may be employed to comply with particular algorithmic or resource limitations.

An example of the results of commanding the search to output the most highly ranked candidate for a variety of values of the summary length control parameter is set forth in the following table.

TABLE 7

| Number of Words | String |
| --- | --- |
| 1 | Iraq |
| 2 | United States |
| 3 | Iraq on Weapons |
| 4 | United States on Iraq |
| 5 | United States in latest week |
| 6 | United States in latest week on Iraq |
| 7 | United States on security cooperation in latest week |

The following computer code appendix contains code in the Java language to implement this invention. The Ultra-Summarise class is the main function that makes a summarizer object, loads a story, creates a search object and uses the Vocabulary class and story to produce a summary. The ViteriSearch class defines the meat of the operation. It takes the LanguageModel class, the TranslationModel class and the story and searches for strings having the highest probability of being used in a summary for the story. The LanguageModel class reads in a file which is a model for summaries containing the probabilities of each word following another. The TranslationModel class reads in a file containing the probabilities that a word will appear in a summary given words in the story. The Story class reads in the story. The Vocabulary class reads in a file that turns words into numbers. The computer code appendix which is conatained on twenty-two pages labeled a1–a22 and attached hereto on separate sheets.

Those skilled in the computer programming arts could implement the invention described herein in a number of computer programming languages. It would not be necessary to use an object oriented programming language such as Java.

As used in the following claims, a "summary string" is a derivative representation of the source document which may, for example, comprise an abstract, key word summary, folder name, headline, file name or the like.

Having thus defined our invention in the detail and particularity required by the Patent Laws, what is desired to be protected by Letters Patent is set forth in the following claims.

What is claimed is:

1. A computer method for preparing a summary string from a source document of encoded text, the method comprising the steps of:

a) comparing a training set of encoded text documents with manually generated summary strings associated therewith to learn probabilities that a given summary word or phrase will appear in summary strings given a source word or phrase appears in an encoded text document;

b) analyzing the manually generated summary strings to learn probabilities that each word or phrase in the manually generated summary strings follows another word or phrase; and c) constructing from the source document a summary string containing summary words or phrases based on the probabilities of appearing in a summary string established in step a) and the probabilities of following another word or phrase established in step b).

2. The computer method according to claim 1, wherein the summary string contains a preselected number of words or phrases.

3. The computer method according to claim 1, wherein the probabilities are learned in step a) by considering the context in which the source word or phrase appears in the encoded text documents.

4. The computer method according to claim 3, wherein the contexts in which the source words or phrases are considered include titles, headings and standard paragraphs.

5. The computer method according to claim 3, wherein the contexts in which the source words or phrases are considered include fonts, bolding and italicizing.

6. The computer method according to claim 3, further comprising learning multiple probabilities that a summary word or phrase will appear in a summary string given a source word or phrase appears in the encoded text considering the various usages of the word or phrase in the encoded text.

7. The computer method according to claim 6, wherein the usages in which the source words are considered are syntactic usages.

8. The computer method according to claim 7, wherein the syntactic usages include the word or phases part of speech.

9. The computer method according to claim 6, wherein the usages in which the source words or phrases are considered are semantic usages.

10. The computer method according to claim 9, wherein the usages in which source words or phrases are considered include usage categories selected from the TIPSTER/MUC standards.

11. The computer method according to claim 9, wherein the usages in which source words or phrases are considered include usage categories selected from the group AGENT, CIRCUMSTANCE, CIRCUMSTANCE/TEMPORAL, COMMUNICATIVE_ACTION and OBJECT.

12. The computer method according to claim 3, wherein step a) takes into consideration external information in the form of queries, user models, past user interaction and other biases to optimize the content of the summary string constructed in step c).

13. The computer method according to claim 1, wherein the training set of encoded text documents and the source document are in one language and the manually generated summary strings are in a second language different than the first language, whereby the constructed summary string is in the second language.

14. The computer method according to claim 3, wherein step b) takes into consideration external information in the form of queries, user models, past user interaction and other biases to optimize the form of the summary string constructed in step c).

* * * * *

UNITED STATES PATENT AND TRADEMARK OFFICE
CERTIFICATE OF CORRECTION

PATENT NO. : 6,317,708 B1
DATED : November 13, 2001
INVENTOR(S) : Michael J. Witbrock et al.

It is certified that error appears in the above-identified patent and that said Letters Patent is hereby corrected as shown below:

Column 3,
Line 42, "mode 15" should read -- model 15 --.
Lines 45-46, "characters or lexemes)" should read -- (characters or lexemes) --.

Column 6,
Line 33, "of-a" should read -- of a -- (delete hyphen).

Column 8,
Line 8, "concerning. the" should read -- concerning the -- (delete period).
Lines 42-44, delete "the computer code appendix which is conatained on twenty-two pages labeled a1-a22 and attached hereto on separate sheets." and insert the text which appears on the attached 22-page appendix numbered a1 through a22.

Signed and Sealed this

Fourteenth Day of May, 2002

*Attest:*

*Attesting Officer*

JAMES E. ROGAN
*Director of the United States Patent and Trademark Office*